United States Patent Office 3,793,285
Patented Feb. 19, 1974

3,793,285
POTTING COMPOUND, HIGH STRENGTH, FOR 550° F. EXPOSURE
Muriel L. Koss, Arlington, Calif., assignor to Rohr Industries, Inc., Chula Vista, Calif.
No Drawing. Filed June 26, 1972, Ser. No. 266,276
Int. Cl. C08g 51/04
U.S. Cl. 260—37 EP                     4 Claims

ABSTRACT OF THE DISCLOSURE

Potting compounds which can be used for fastener reinforcement of honeycomb panel structures. Components of the potting compound include dicyclopentadiene dioxide, maleic anhydride, a bifunctional epichlorohydrin bisphenol A epoxy resin, and a filler selected from the group including calcium carbonate and silica. The compounds may additionally include benzophenone tetracarboxylic dianhydride.

BACKGROUND OF THE INVENTION

This invention relates to potting compounds and more particularly to compounds for use in reinforcing the cellular cores of honeycomb panel structures. Fasteners, such as rivets or bolts, are used in the joining or attachment of such panel structures and the regions within the honeycomb core surrounding the fasteners must be reinforced in order to maintain the integrity of the structure. In addition, for certain types of panels, e.g. welded, brazed or diffusion bonded, it is desirable that the potting compounds be capable of injection into each cell of the core through small holes in the facing sheet in the region to be reinforced. The compounds have to be sufficiently fluid to be injected through small approximately $\frac{1}{16}$ inch diameter holes and have sufficient working life to permit completion of the required multiple injections. The compounds have to sustain structural compressive loads through a temperature range to 550° F. and bond sufficiently well to the core to maintain structural integrity. Such compounds are provided by the present invention.

SUMMARY OF THE INVENTION

Potting compounds have been discovered for use in aircraft honeycomb sandwich panel structures which consist of a cyclic dioxide, an anhydride, an epoxy resin, and a filler.

DESCRIPTION OF THE PREFERRED EMBODIMENTS

In accordance with one aspect of the present invention there is prepared a potting compound having good resistance to aging at temperatures up to 420° F. and good structural properties at temperatures up to 550° F. The compound is sufficiently fluid to be extruded through small diameter orifices into the core cells of a honeycomb sandwich structure. After curing, it hardens and reinforces the sandwich structure. The compound consists of the following components:

Component A

Dicylopentadiene dioxide in a weight ratio of 50 to 85 parts.

Component B

Maleic anhydride in a weight ratio of 31 to 84 parts depending upon resin ratio (0.45 to 0.8 anhydride equivalent).

Component C

A bifunctional epichlorohydrin bisphenol A epoxy resin with an epoxide equivalent weight in the range of 425–550 used in a weight ratio of 15 to 50 parts.

Component D

A filler from the group consisting of calcium carbonate in the weight ratio of 150 to 250 parts, and silica, of particle size 98 percent minimum through 325 mesh, in a weight ratio of 200 to 350 parts.

The dicyclopentadiene dioxide, a solid, may, for example, be that from Velsicol Chemical Corp.; the maleic anhydride, a solid, may be that from Monsanto Chemical Co.; the epoxy resin, a solid, may be Shell Chemical Company's Epon 1001; the calcium carbonate, a powder, may be Diamond Alkali Co.'s Carbium; and the silica, a granular solid, may be Tamm Industries' Silver Bond B.

EXAMPLE 1

A potting compound was prepared which consists of the following components:

Component A

The dicyclopentadiene dioxide in the weight ratio of 67 parts.

Component B

The maleic anhydride in the weight ratio of 43.3 parts.

Component C

The bifunctional bisphenol A epoxy resin with an epoxide equivalent weight in the range of 425–550 in the weight ratio of 33 parts.

Component D

The calcium carbonate in the weight ratio of 200 parts.

Blending procedure

Components A and B are first melted together. The fluid mixture is then cooled to approximately 170° F., the component C is added, and the mixture is blended until homogeneous. The component D is then incorporated into the mixture and thoroughly blended.

| | Ultimate compressive strength, k.s.i. | | | |
|---|---|---|---|---|
| R.T. | 400° F. | 500° F. | 553° F. | Post cure temp., ° F |
| 30.1 | 10.3 | 7.3 | 4.5 | 400 |
| 36.9 | | 12.2 | 7.2 | 500 |
| | Ultimate tensile shear strength, k.s.i. | | | |
| 2,150 | 2,270 | 890 | | 400 |

| | 553° F. aging | | 420° F. aging | |
|---|---|---|---|---|
| Test temp., ° F. | Control | 10 hours | 192 hours | 410 hours |
| | Tensile shear strength, p.s.i. | | | |
| R.T. | 1,600 | 1,070 | 1,400 | 1,360 |
| 553° F. | 730 | 630 | 640 | 680 |
| | Compressive strength, k.s.i. | | | |
| R.T. | 30.5 | 23.5 | 35.5 | 40.1 |
| 553° F. | 5.6 | 5.5 | 7.2 | 6.9 |

In accordance with another aspect of the invention there is prepared a potting compound which can be extruded through small diameter orifices into the honeycomb sandwich cells, cured in place, and used to reinforce the sandwich structure. It has good mechanical properties at temperatures up to 550° F. The compound consists of the following components:

Component A

Dicyclopentadiene dioxide in a ratio of 50 to 90 parts by weight.

Component B

Maleic anhydride in a weight ratio of 22 to 73 parts, used in a stoichiometric ratio of 0.25 to 0.65 anhydride equivalent.

Component C

A bifunctional bisphenol A epoxy with an epoxide equivalent of 180 to 195, used in a ratio of 10 to 50 parts by weight.

Component D

A filler from the group consisting of calcium carbonate in the ratio of 100 to 250 parts by weight and silica, of particle size 98 percent minimum through 325 mesh, in ratio of 100 to 300 parts by weight.

Component E 3,3',4,4'-benzophenone tetracarboxylic dianhydride in a weight ratio of 35 to 157 parts, used in a stoichiometric ratio of 0.25 to 0.85 anhydride equivalent.

The epoxy resin, a liquid, may be Shell Chemical Company's Epon 828 and the benzophenone tetracarboxylic dianhydride, a powder, may be that produced by Gulf Oil Company.

Example 2

A potting compound was prepared which consists of the following components:

Component A

The dicyclopentadiene dioxide in the weight ratio of 67 parts.

Component B

The maleic anhydride in the weight ratio of 24.3 parts.

Component C

The bifunctional bisphenol A epoxy with epoxide equivalent of 180 to 195 in the weight ratio of 33 parts.

Component D

The calcium carbonate in the weight ratio of 200 parts.

Component E

The 3,3',4,4'-benzophenone tetracarboxylic dianhydride in the weight ratio of 39.9 parts.

Blending Procedure

Components A and B are melted together. The components C and E are then added, and component D thoroughly blended therein.

| R.T. | Ultimate compressive strength, k.s.i. | | | Post cure temp., °F |
|---|---|---|---|---|
| | 400° F. | 500° F. | 553° F. | |
| 28.3 | | 11.5 | 8.2 | 400 |
| | Ultimate tensile shear strength, k.s.i. | | | |
| 1,870 | 2,300 | 1,920 | 1,290 | 400 |

It will be apparent that several examples of potting compounds have been described which are well suited for use in honeycomb core sandwich panel structures for fastener reinforcement thereof. Obviously many modifications and variations of this invention are possible in the light of the above teachings. It is therefore to be understood that within the scope of the appended claims the invention may be practiced otherwise than as specifically described.

What is claimed is:

1. A potting compound consisting of:
   dicyclopentadiene dioxide in the weight ratio of 50 to 85 parts;
   maleic anhydride 0.45 to 0.8 anhydride equivalent in the weight ratio of 31 to 84 parts;
   bifunctional epichlorohydrin bisphenol A epoxy resin with an epoxide equivalent weight in the range of 425 to 550 in the weight ratio of 15 to 50 parts; and
   a filler from the group consisting of calcium carbonate in the weight ratio of 150 to 250 parts, and silica of particle size 98 percent minimum through 325 mesh in the weight ratio of 200 to 350 parts.

2. The potting compound of claim 1:
   the dicyclopentadiene dioxide in the weight ratio of 67 parts;
   the maleic anhydride in the weight ratio of 43.3 parts;
   the bifunctional epichlorohydrin bisphenol A epoxy resin in the weight ratio of 33 parts; and
   the filler calcium carbonate in the weight ratio of 200 parts.

3. A potting compound consisting of:
   dicyclopentadiene dioxide in the weight ratio of 50 to 90 parts;
   maleic anhydride in a stoichiometric ratio of 0.25 to 0.65 anhydride equivalent in the weight ratio of 22 to 73 parts;
   bifunctional bisphenol A epoxy resin with epoxide equivalent of 180 to 195 in the weight ratio of 10 to 50 parts by weight;
   a filler from the group consisting of calcium carbonate in the weight ratio of 100 to 250 parts, and silica of particle size 98 percent minimum through 325 mesh in the weight ratio of 100 to 300 parts; and
   3,3',4,4'-benzophenone tetracarboxylic dianhydride in a stoichiometric ratio of 0.25 to 0.85 anhydride equivalent in the weight ratio of 35 to 157 parts.

4. The potting compound of claim 3:
   the dicyclopentadiene dioxide in the weight ratio of 67 parts;
   the maleic anhydride in the weight ratio of 24.3 parts;
   the bifunctional bisphenol A epoxy resin in the weight ratio of 33 parts;
   the filler calcium carbonate in the weight ratio of 200 parts; and
   the 3,3',4,4'-benzophenone tetracarboxylic dianhydride in the weight ratio of 39.9 parts.

References Cited

UNITED STATES PATENTS

| 2,935,488 | 5/1960 | Phillips et al. | 260—830 TW |
| 3,242,116 | 3/1966 | Becker et al. | 260— 37 EP X |
| 3,078,279 | 2/1963 | McCracken et al. | 260—47 EA UX |
| 3,262,987 | 7/1966 | McGary et al. | 260—830 TW X |
| 3,100,756 | 8/1963 | Fry | 260—830 TW X |

OTHER REFERENCES

Lee et al.: Handbook of Epoxy Resins, McGraw-Hill Book Co., 1967, pp. 14-2, 14-3.

LEWIS T. JACOBS, Primary Examiner

U.S. Cl. X.R.

260—830 TW